(12) United States Patent
Wezel

(10) Patent No.: US 9,039,071 B2
(45) Date of Patent: May 26, 2015

(54) DEVICE FOR ABSORBING MECHANICAL ENERGY FOR MOTOR VEHICLES

(71) Applicant: Dr. Ing. h.c. F. Porsche Aktiengesellschaft, Stuttgart (DE)

(72) Inventor: Christoph Wezel, Renningen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/107,467

(22) Filed: Dec. 16, 2013

(65) Prior Publication Data

US 2014/0167449 A1 Jun. 19, 2014

(30) Foreign Application Priority Data

Dec. 17, 2012 (DE) .......... 10 2012 112 419

(51) Int. Cl.
*B62D 21/15* (2006.01)
(52) U.S. Cl.
CPC .................. *B62D 21/152* (2013.01)
(58) Field of Classification Search
USPC ........ 296/187.03, 29; 293/102, 132, 133, 155
See application file for complete search history.

(56) References Cited

U.S. PATENT DOCUMENTS

| | | | |
|---|---|---|---|
| 3,595,335 | A | 7/1971 | Wessells et al. |
| 3,741,593 | A * | 6/1973 | Toti ............................ 403/278 |
| 3,746,378 | A * | 7/1973 | Meyer ........................... 52/511 |
| 6,270,131 | B1 | 8/2001 | Martinez et al. |
| 6,923,474 | B2 | 8/2005 | Frasch et al. |
| 8,246,091 | B1 * | 8/2012 | Jayasuriya et al. ........... 293/133 |
| 2006/0214414 | A1 | 9/2006 | Wehner et al. |
| 2010/0060040 | A1 | 3/2010 | Yasuhara et al. |

FOREIGN PATENT DOCUMENTS

| | | |
|---|---|---|
| DE | 2 046 251 | 4/1971 |
| DE | 24 41 557 A1 | 3/1976 |
| DE | 102 21 299 C1 | 10/2003 |
| DE | 600 06 015 T2 | 6/2004 |
| DE | 10 2009 041 767 A1 | 3/2011 |
| EP | 0 958 992 | 11/1999 |
| GB | 1 544 001 | 4/1979 |

OTHER PUBLICATIONS

Search Report DE 10 2012 112 419.1 dated Jun. 10, 2013 with partial English translation.
Korean Patent Application No. 10-2013-154621 Notice of Preliminary Rejection dated Oct. 24, 2014.
Search Report dated Jul. 28, 2014, issued in French counterpart Application No. 1382414.

* cited by examiner

*Primary Examiner* — H Gutman
(74) *Attorney, Agent, or Firm* — RatnerPrestia

(57) ABSTRACT

A device (1) for absorbing mechanical energy for motor vehicles, wherein the device (1) has a honeycomb-like cavity structure (2) and is arranged between a first body section (3) and a second body section (4). In order that, in the event of a crash, the body sections (3, 4) are not displaced relative to one another, the device (1) can be deformed during the absorption of mechanical energy, wherein the deformation generates a force-fitting connection between the two body sections (3, 4). The device has a centre of rotation (12) about which the device (1) can be deformed in a rotational manner during a deformation, such that a force-fitting connection is generated between the two body sections (3, 4).

8 Claims, 2 Drawing Sheets

DEVICE FOR ABSORBING MECHANICAL ENERGY FOR MOTOR VEHICLES

CROSS-REFERENCE TO RELATED APPLICATIONS

This application claims priority of German Patent Application No. 10 2012 112 419.1, filed Dec. 17, 2012, which is incorporated by reference herein in its entirety.

FIELD OF INVENTION

The present invention relates to a device for absorbing mechanical energy for motor vehicles, wherein the device has a honeycomb-like cavity structure and is arranged between a first body section and a second body section.

BACKGROUND

DE 20 46 251 C3 discloses a device of said type. In the already-known device for absorbing mechanical energy, a deformable front part of bodies for motor vehicles is provided, which deformable front part is arranged in a spare-wheel well of the motor vehicle and, in the event of frontal collisions, prevents the spare wheel, in a horizontal position, from being pushed through the bulkhead into the passenger compartment or into a fuel tank. It is provided here that the force flow in the event of a crash is not dissipated by the spare wheel but rather is absorbed by the bumper via a metal support plate and a metal reinforcement plate. It is also provided that the spare wheel is guided rearward and upward in the event of a crash.

DE 102 21 299 C1 discloses a crash support which has a protective and energy-absorbing action in the event of a collision. For this purpose, the already-known crash support has a hook-in connection at the front end and has, at the rear free end, a support with respect to a beam.

In the case of the already-known devices, it may be a problem that a displacement of the components occurs in the event of a crash, and the energy generated by the crash is not dissipated to the body of the motor vehicle.

SUMMARY

It is therefore an object of the present invention to improve a device of the generic type mentioned in the introduction such that the energy from a crash or from an accident situation is dissipated to the body structure of the motor vehicle.

Said object is achieved by means of a device having the features of patent claim 1. Advantageous refinements emerge from the subclaims. It is provided here that the device can be deformed during the absorption of mechanical energy, wherein the deformation generates a force-fitting connection between the two body sections. By means of said measure, it is achieved that the body sections are not displaced over one another. The body sections should not be displaced over one another in the event of a crash because this would absorb less energy from the crash. The present invention ensures that the body sections are not displaced over one another.

In one advantageous refinement of the subject matter of the invention, a lug is formed whose cross section has a honeycomb-like cavity. Here, the lug interacts with a projection on the first body section such that, during a deformation of the device, the projection is at least partially surrounded by the deformed lug. By means of this measure, a force-fitting connection is realized between the first body section and the device.

The device has a pocket into which the second body section projects, wherein the pocket has two walls which are substantially parallel to one another. It is provided here that one wall of the pocket has a centre of rotation about which the device can be deformed in a rotational manner during a deformation, and wherein the other wall of the pocket can be placed in abutment against the second body section such that a force-fitting connection can be generated between the two body sections. By means of this measure, a force-fitting connection is realized between the device and the second body section, whereby the force flow path between the two body sections is established and a force-fitting connection is realized between the two body sections.

The device according to the invention is characterized in that, after a deformation of the device, the force flow path between the first body section and the second body section is established.

In a particularly advantageous refinement of the device according to the invention, it is provided that that wall of the pocket which has the centre of rotation at least partially has a greater material thickness than the other parts of the honeycomb-like cavity structure. It is provided here that the device is manufactured from aluminum or an aluminum alloy.

It is preferable for the first body section to be a luggage compartment region of the motor vehicle and for the second body section to be connected to a passenger compartment region of the motor vehicle.

A further advantageous refinement of the device according to the invention provides that a central receptacle is provided for a screw connection to the second body section. By means of this measure, only one screw is required for the mounting of the device according to the invention.

BRIEF DESCRIPTION OF THE DRAWINGS

The present invention will be explained in more detail on the basis of an exemplary embodiment and in conjunction with the appended drawing, in which.

DETAILED DESCRIPTION

Figure 1:
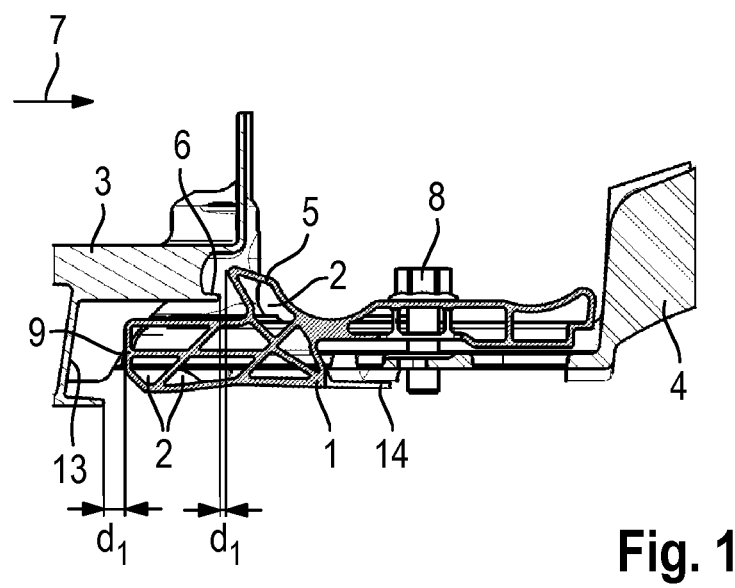
FIG. 1 is a schematic sectional illustration of the device according to the invention in the installed position thereof.

FIG. 1 is a sectional illustration showing a device 1 for absorbing mechanical energy for motor vehicles. Here, the device 1 has a honeycomb-like cavity structure 2 and is arranged between a first body section 3 and a second body section 4. The first body section 3 is in this case for example a luggage compartment region of the motor vehicle, whereas the second body section 4 is connected to a passenger compartment region of the motor vehicle. The arrow denoted by the reference 7 in FIG. 1 indicates the action of force on the device 1 in the event of a crash. The concept is for the device 1 to be deformed during the absorption of mechanical energy and, in so doing, to generate a force-fitting connection between the two body sections 3, 4. For this purpose, the device has a lug 5 whose cross section likewise has a honeycomb-like cavity 2. As will be explained in more detail below, the lug 5 interacts with a projection 6 on the first body section 3 such that, during a deformation of the device 1, the projection 6 is at least partially surrounded by the deformed lug 5.

Furthermore, the device 1 has a support surface 9 which interacts with a further support surface 13 formed on the first body section 3. In the installed position of the device 1 illustrated in FIG. 1, in a non-deformed state, a gap d1 is present between the lug 5 and the projection 6, and a gap d2 is present between the support surface 9 and the support surface 13. The gap dimensions d1 and d2 are required for the installation of the device 1. As can also be seen from FIG. 1, the device 1 is fixedly connected to the second body section 4 by means of a screw connection through a central receptacle 8. The central receptacle 8 has the effect that only a single screw is required for the mounting and installation of the device 1. In this way, the installation of the device 1 is simplified considerably.

Figure 2:
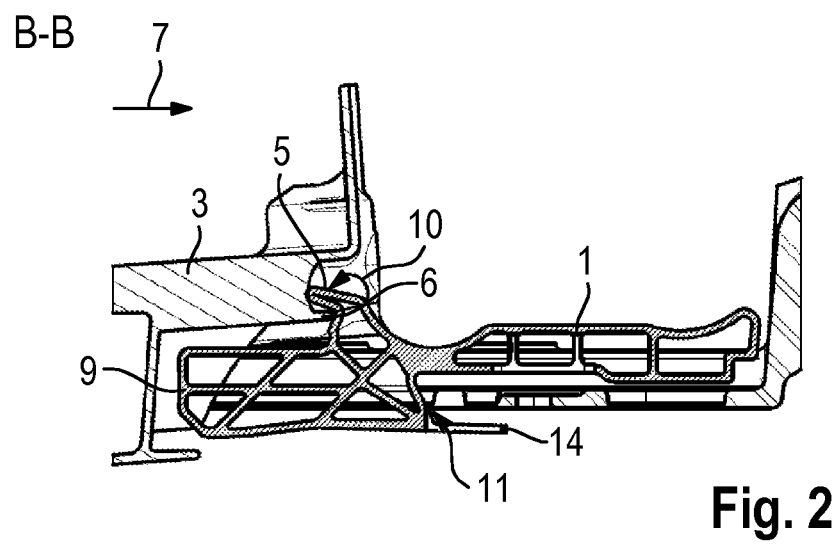
FIG. 2 is a sectional illustration, corresponding to FIG. 1, of the device according to the invention with an introduction of force having partially taken place.

FIG. 2 shows an illustration in which a part of the force from a crash has already been introduced into the device 1. Here, by contrast to FIG. 1, the component 3 has already been displaced to the right, and the gap dimension d1 has been closed. The projection 6 has been placed in engagement with the lug 5 such that the lug 5 has deformed. During the deformation of the lug 5, the latter has, owing to the honeycomb-like cavity structure 2, bent around the projection 6, and the lug 5 at least partially surrounds the projection 6. The force in the direction of the arrow 7 is thus conducted from the body section 3 into the device 1. The deformation of the lug 5 is indicated by the arrow with the reference sign 10.

Figure 3:
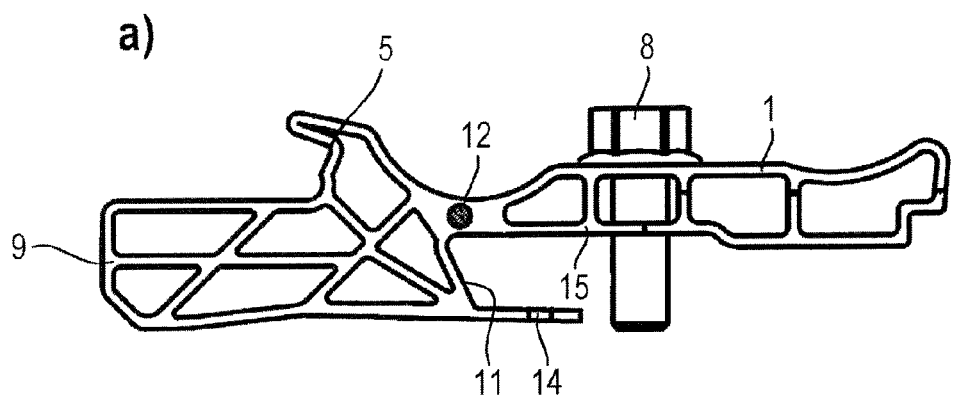
FIG. 3a is a further sectional illustration of the device.
FIG. 3b is a schematic illustration for explaining the mode of operation of the device according to the invention.
Figure 3:
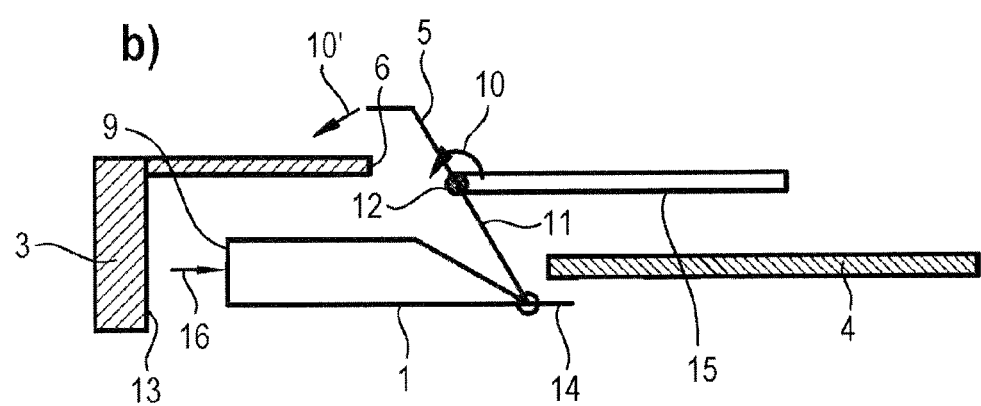

FIGS. 3*a* and *b* show the operational principle of the device 1. In FIG. 3*a*, by contrast to FIGS. 1 and 2, the device 1 is illustrated without the adjoining body sections 3, 4. The situation illustrated in FIG. 3 corresponds to the situation illustrated in FIG. 2. Here, the lug 5 of the device 1 has already been deformed. The support surface 9 is situated in the front region of the device 1. As can also be seen from FIG. 3*a*, the device 1 has a pocket 11 into which the second body section 4 projects in the installed position. The pocket 11 has two walls 14 and 15 which are substantially parallel to one another. The wall 15 of the pocket 11 comprises a centre of rotation 12 about which the device 1 can be deformed in a rotational manner during a deformation in the event of a crash. After the rotation caused by the deformation, the other wall 14 of the pocket 11 bears against the second body section 4, such that a force-fitting connection is realized between the device 1 and the body section 4.

To explain the function of the device 1 in more detail, FIG. 3*b* shows a schematic illustration which explains the operational principle of the device 1 in the event of a crash. As already stated, when an introduction of force has partially taken place via the body section 3, the projection 6 is initially placed in engagement with the lug 5. As a result, the lug 5 deforms and performs a partial rotational movement in a direction toward the body section 3, as indicated by the force arrow 10' in FIG. 3*b*. During a further introduction of force via the body section 3, the support surface 13 of the body section 3 comes into abutment against the support surface 9 of the device 1, as indicated by the arrow with the reference numeral 16. After the body section 3 has come into contact, by way of its support surface 13, with the device 1, the device 1 rotates about its centre of rotation 12, as indicated by the motion arrow 10. As a result, the wall 14 of the pocket 11 moves in the direction of the motion arrow 15 toward the second body section 4, such that the body section 4 is clamped in the pocket 11 between the two walls 14, 15. It is thus the concept for the device 1 to perform an intrinsic rotation or a structure-induced rotation about the centre of rotation 12 in the manner of a flap lever, and to thus connect the body sections 3 and 4 to one another in a force-fitting manner.

Thus, in the event of a crash, the lug 5 is initially deformed by the projection 6 of the body section, and thus the device 1 is placed in operative connection with the body section 3. A further movement of the body section 3 to the right in FIG. 3*b* brings the support surface 13 of the body section 3 into engagement with the support surface 9 of the device 1. As a result, an intrinsic rotation of the device 1 about the centre of rotation 12 is effected, and the wall 14 of the pocket 11 abuts against the second body section 4 and clamps the latter therein. As a result, the body section 4 is clamped to the pocket 11 by the walls 14, 15. The clamping action has the effect that, during a further introduction of force via the body section 3, no further displacement of the body sections 3, 4 relative to one another is possible. A further introduction of force into the body section 3 has the effect that said force is dissipated via the device 1 into the body section 4.

It is the main concept of the invention that, in the event of a crash, the device 1, owing to its construction, realizes a force fit between the body section 3 and the device and a further force fit between the device and the body section 4, such that a force-fitting connection is generated between the two body sections 3, 4, and a vertical deflection movement of one of the two body sections 3, 4 is prevented. For this purpose, the device is constructed such that it performs a rotational movement about a centre of rotation in the manner of a flap lever, and such that the device 1 is clamped in each case to the body sections 3, 4. The device 1 is manufactured from aluminum or an aluminum alloy in order that it accounts for as little as possible of the overall weight of the motor vehicle. As can be seen in FIGS. 1, 2 and 3*a*, that wall 15 of the pocket 11 which has the centre of rotation 12 is provided at least partially with a relatively large material thickness, in order that the device does not break during the rotation or during the deformation.

The invention claimed is:

1. A device (1) for absorbing mechanical energy for motor vehicles, wherein the device (1) has a honeycomb-like cavity structure (2) and is arranged between a first body section (3) and a second body section (4), wherein the device (1) can be deformed during the absorption of mechanical energy, wherein the deformation generates a force-fitting connection between the two body sections (3, 4), wherein, on the device (1), there is formed a lug (5) whose cross section has a honeycomb-like cavity and which interacts with a projection (6) on the first body section (3) such that, during a deformation of the device (1), the projection (6) is at least partially surrounded by the deformed lug (5).

2. The device (1) as claimed in claim 1, wherein the device (1) has a pocket (11) into which the second body section (4) projects, wherein the pocket (11) has two walls (14, 15) which are substantially parallel to one another.

3. The device (1) as claimed in claim 2, wherein one wall (15) of the pocket (11) has a centre of rotation (12) about which the device (1) can be deformed in a rotational manner during a deformation, and the other wall (14) of the pocket (11) can be placed in abutment against the second body section (4) such that a force-fitting connection can be generated between the two body sections (3, 4).

4. The device as claimed in claim 3, wherein, after a deformation of the device (1), the force flow path between the first body section (3) and the second body section (4) is established.

5. The device (1) as claimed in claim 3, wherein the wall (15) of the pocket (11) which has the centre of rotation (12) at least partially has a greater material thickness than the other parts of the honeycomb-like cavity structure (2).

6. The device (1) as claimed in claim 1, wherein the device (1) is manufactured from aluminum or an aluminum alloy.

7. The device (1) as claimed in claim 1, wherein the first body section (3) is a luggage compartment region of the motor vehicle, and the second body section (4) is connected to a passenger compartment region of the motor vehicle.

8. The device (1) as claimed in claim 1, wherein a central receptacle (8) is provided for a screw connection to the second body section (4).

\* \* \* \* \*